US008645977B2

(12) United States Patent
Jacobson et al.

(10) Patent No.: US 8,645,977 B2
(45) Date of Patent: Feb. 4, 2014

(54) EXTENSIBLE APPLICATION VIRTUALIZATION SUBSYSTEMS

(75) Inventors: Neil A. Jacobson, Arlington, MA (US); John Sheehan, Cambridge, MA (US); Eric Jewart, Waltham, MA (US)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 12/699,901

(22) Filed: Feb. 4, 2010

(65) Prior Publication Data

US 2011/0191788 A1    Aug. 4, 2011

(51) Int. Cl.
*G06F 3/00*    (2006.01)

(52) U.S. Cl.
USPC ......................................................... 719/328

(58) Field of Classification Search
None
See application file for complete search history.

(56) References Cited

U.S. PATENT DOCUMENTS

| | | | |
|---|---|---|---|
| 7,280,998 | B1 | 10/2007 | Aboujaoude et al. |
| 2007/0143559 | A1 | 6/2007 | Yagawa |
| 2008/0052776 | A1 | 2/2008 | Prabhat et al. |
| 2009/0007126 | A1 | 1/2009 | Jelinek et al. |
| 2009/0044170 | A1 | 2/2009 | Bernardi et al. |
| 2009/0089406 | A1 | 4/2009 | Roush et al. |
| 2009/0133001 | A1 | 5/2009 | Rozenfeld |
| 2009/0249051 | A1 * | 10/2009 | TeNgaio et al. .................. 713/1 |
| 2009/0254899 | A1 | 10/2009 | Shlomai et al. |
| 2010/0037206 | A1 * | 2/2010 | Larimore et al. ............. 717/109 |

FOREIGN PATENT DOCUMENTS

KR    2008/004713    *    2/2009    ............... G06F 9/44

OTHER PUBLICATIONS

"VMware ThinApp Agentless Application Virtualization Overview",Retrieved at<<http://www.vmware.com/files/pdf/thinapp_intro_whitepaper.pdf>>,2008, pp. 8.
"Extending Virtualization in the Data Center with Application Infrastructure Virtualization: Introducing WebSphere Virtual Enterprise", Retrieved at<<ftp://ftp.software.ibm.com/software/webservers/appserv/WebSphere_Virtual_Enterprise_wp.pdf>>, Apr. 2008, pp. 16.
Kineey Anthony, "Getting Started with Microsoft Application Virtualization", Retrieved at<<http://technet.microsoft.com/en-us/magazine/2008.10.appv.aspx?pr=blog#id0110063>>, 2009, pp. 6.
"Deploying Application Virtualization at Microsoft",Retrieved at<<http://www.microsoft.com/CaseStudies/ServeFileResource.aspx?4000009337>>, Apr. 2009, pp. 8.

(Continued)

*Primary Examiner* — Emerson Puente
*Assistant Examiner* — Sisley Kim
(74) *Attorney, Agent, or Firm* — Jim Sfekas; Kate Drakos; Micky Minhas (57) ABSTRACT

An extensible virtualization system provides an object model and manages a virtual application lifecycle in a way that allows new virtualization subsystems to be added to extend a virtualization product without reworking the product itself. Virtualizing an application generally involves three steps: metadata extraction, metadata storage and reconstitution, and runtime management of requests. The extensible virtualization system receives notification of an application preparation session and allows virtualization subsystems to monitor the session to collect configuration information specific to each subsystem that the application uses to run on a client. Each subsystem provides collected information to the extensible virtualization system, which stores the collected information until the application to be virtualized is deployed. When the application is deployed, the system invokes the same virtualization subsystem and provides the subsystem with the stored information.

21 Claims, 4 Drawing Sheets

(56) References Cited

OTHER PUBLICATIONS

"App-V Extensibility Today Before the SDK", Retrieved at<<http://download.microsoft.com/download/f/7/8/f784a197-73be-48ff-83da-4102c05a6d44/App-V_Extensibility_Today_Before_the_SDK.docx>>, 2008, pp. 22.

* cited by examiner

EXTENSIBLE APPLICATION VIRTUALIZATION SUBSYSTEMS

BACKGROUND

Virtualization refers to the execution of a virtual machine by physical hardware and then running operating systems and applications on the virtual machine. The virtual machine may represent a least common denominator of hardware functionality or may represent a well-known configuration for which it is easy to prepare an operating system and applications. Many data centers use virtualization to be able to easily move a virtual machine to new physical hardware as resource requirements increase, for maintenance cycles, and to balance physical server loads. Virtualization is useful for many situations, but can also impose limitations that occur due to many virtual machines contending for the same resources (e.g., central processing unit (CPU), memory, and network interface card (NIC)).

Application virtualization provides a virtual environment at the level of a single application, isolating the application from the underlying OS similarly to the way a virtual machine isolates an OS from the underlying hardware. For example, an operating system may natively run some applications, while providing a virtual environment for running others. This may allow the operating system, for example, to run applications designed for a different operating system. Application virtualization blurs the distinction for the user between applications running natively in the host operating system and applications running in a virtual environment. For example, both types of applications may appear side by side in a taskbar or menu provided by the operating system shell. MICROSOFT Application Virtualization (App-V), for example, transforms applications into centrally managed virtual services that are not installed and do not conflict with other applications. In a physical environment, every application depends on its operating system (OS) for a range of services, including memory allocation, device drivers, and much more. Incompatibility between an application and its OS can be addressed by either server virtualization or presentation virtualization—but incompatibility between two applications installed on the same instance of an OS is solved by application virtualization.

Developers of application virtualization products often extend application virtualization subsystems within the product. For example, the developer may want to virtualize a part of the operating system that was not previously virtualized to increase application isolation. One example using a MICROSOFT WINDOWS system is adding support for virtualizing COM+. COM+ is an evolution of MICROSOFT Component Object Model (COM) and MICROSOFT Transaction Server (MTS). In existing application virtualization solutions, virtualization subsystems are tightly coupled with the product. In existing products, this coupling means that adding support for a new extension point like COM+ involves significant rework of the product. In addition, subsystem implementation involves significant expertise and understanding of operating system internals (not just subsystem-specific knowledge).

SUMMARY

An extensible virtualization system is described herein that provides an object model and manages a virtual application lifecycle in a way that allows new virtualization subsystems to be added to extend a virtualization product without reworking the product itself. Virtualizing an application generally involves three steps: metadata extraction, metadata storage and reconstitution, and runtime management of requests. The extensible virtualization system receives notification of an application preparation session and allows virtualization subsystems to monitor the session to collect configuration information specific to each subsystem that the application uses to run on a client. Each subsystem provides collected information to the extensible virtualization system, which stores the collected information until the application to be virtualized is deployed. When the application is deployed, the system invokes the same virtualization subsystem and provides the subsystem with the stored information. Thus, the extensible virtualization system provides a generic model useful to many types of virtualization subsystems that allows a virtualization product implementing the system to be more easily extended with less impact to the product.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An extensible virtualization system is described herein that provides an object model and manages a virtual application lifecycle in a way that allows new virtualization subsystems to be added to extend a virtualization product without reworking the product itself. Virtualizing an application generally involves three steps: metadata extraction, metadata storage and reconstitution, and runtime management of requests. Metadata extraction is the process of knowing when an application is being prepared for virtualization and monitoring the application to extract configuration information. Configuration information can include any way in which an application ties itself to an operating system or other applications. The extensible virtualization system receives notification of an application preparation session and allows virtualization subsystems to monitor the session to collect configuration information specific to each subsystem that the application uses to run on a client. Each subsystem provides collected information to the extensible virtualization system, which stores the collected information until the application to be virtualized is deployed. When the application is deployed, the system invokes the same virtualization subsystem and provides the subsystem with the stored information. The subsystem uses this information and information from the client to reconstitute the metadata and from this knowledge knows how to perform subsystem-specific steps to virtualize the application.

For example, if an administrator wants to virtualize a MICROSOFT Internet Information Server (IIS) web application, IIS uses an 'application pool' identifier to manage the web application instance. In this instance, the monitoring portion of the extensible virtualization system will find registered virtualization subsystems. In this case, the system will inject an IIS virtualization subsystem into new processes. When a process is created, the extensible virtualization system receives a notification, and detects by subsystem-specific methods that IIS is registering a web application. Alternatively or additionally, the subsystem may take a snapshot of configuration information before and after installation of the application and store the differences as application metadata. The IIS virtualization subsystem will extract the information needed to virtualize the web application, such the web application pool's name, modify the request as needed to run on another client (e.g., by ensuring the application pool name is not already used), and let the request continue. When the web application is deployed, the extensible virtualization system will discover that this virtual application relies on the IIS virtualization subsystem, load that subsystem, and then notify the subsystem that a web application is being created. The extensible virtualization system will provide the IIS virtualization subsystem with the information the subsystem gathered about the web application during monitoring. At run time, when IIS creates a web application pool with that particular name, the IIS virtualization subsystem will know enough to find and create that particular virtual application. The same steps can be used to provide virtualization for a variety of other types of applications and subsystems. Thus, the extensible virtualization system provides a generic model useful to many types of virtualization subsystems that allows a virtualization product implementing the system to be more easily extended with less impact to the product. In addition, using the system a virtualization subsystem author can focus more on subsystem-specific behavior and the subsystem implementation involves less knowledge of operating system-specific knowledge that is handled by the extensible virtualization system.

The major responsibilities of an application virtualization subsystem are monitoring, visualization, registration, and runtime virtualization. Each of these is described separately herein.

Monitoring involves watching an installation process to detect changes made to a computer system. In some embodiments, an application called the Sequencer is responsible for the monitoring phase of application virtualization. Some subsystems may hook application-programming interfaces (APIs) to monitor the installation, and others may just compare the computer system state before and after the installation. An example of the former is a virtual services subsystem hooks the CreateService( ) API to detect when new operating system services are added by an installer. The IIS subsystem described in the previous example, on the other hand, can gather the information it uses by comparing the IIS configuration before and after an install.

Visualization involves showing an administrator preparing an application for virtualization a visual indication of the changes made by an application. The Sequencer displays the changes detected during monitoring in a series of tabs. The extensible virtualization system places responsibility for implementing visualization with each subsystem. Each subsystem provides a user interface for visualization that is appropriate for that subsystem. This eliminates the need for the Sequencer to have explicit knowledge of each subsystem during the visualization phase. The subsystems' visualization interfaces are responsible for displaying their results in a window created for them by a visualization application of the extensible virtualization system.

Registration involves preparing a client computer system to run a virtual application. Although virtual applications are not installed on the client, some information is published to the client to provide a seamless user experience (e.g., so that the application shows up in the Start Menu). The extensible virtualization system publishes information collected by the subsystem during monitoring to appropriate configuration locations on the client. For example, a virtualized IIS web application may modify the IIS configuration of the client to provide the client knowledge of the existence of the application (so that the user can start the application).

Another responsibility of the subsystem closely related to registration is configuration. Registration is performed once; however, configuration can occur many times after the subsystem registers its components. An example of registration is creating the IIS web sites, applications, and application pools described herein. An example of a configuration item is a database connection string. This value may need to change after the application is registered if the backend database for the application is moved. The subsystem is responsible for applying any subsystem specific configuration values, such as configuration that requires specific knowledge of the subsystem to be applied (e.g., may need to be set by calling a specific API).

Runtime virtualization refers to the hooking of functions and altering the functions' behavior during runtime of a virtualized application so that the application can access its resources as if it is locally installed on the client. Runtime virtualization also refers to decision making of whether or not certain system processes (i.e., processes not part of the virtual application's package) should be virtualized. For example, the IIS subsystem determines whether or not the IIS worker process should be virtualized based on an application pool name passed on the command line.

Figure 1:
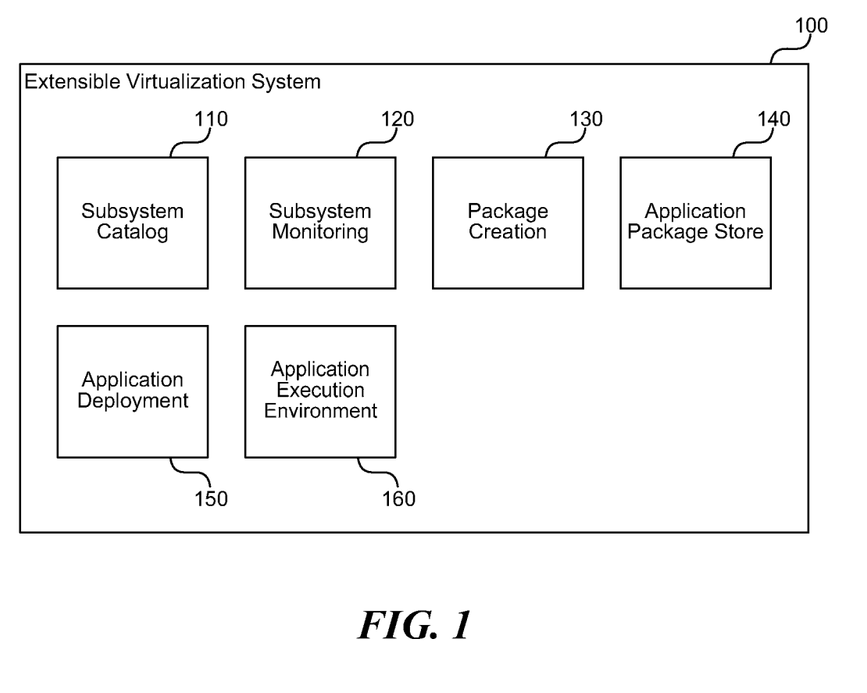
FIG. 1 is a block diagram that illustrates components of the extensible virtualization system, in one embodiment.

FIG. 1 is a block diagram that illustrates components of the extensible virtualization system, in one embodiment. The system 100 includes a subsystem catalog component 110, a subsystem monitoring component 120, a package creation component 130, an application package store 140, an application deployment component 150, and an application execution environment 160. Each of these components is described in further detail herein.

The subsystem catalog component 110 receives a registration request from at least one virtualization subsystem, wherein registration allows a core virtualization system to virtualize applications using the virtualization subsystem without updating instructions of the core virtualization system. For example, a COM+ virtualization subsystem installed to a client computer may register itself with the core virtualization system. When a user requests to virtualize a COM+ application, the core virtualization system invokes the COM+ virtualization subsystem, which provides subsystem-specific monitoring of the COM+ application to detect configuration changes. In addition, when the virtualized application runs on a client, the core virtualization system again invokes the virtualization subsystem to perform subsystem-specific runtime handling of the application.

The subsystem monitoring component 120 invokes a registered virtualization subsystem to monitor an application being prepared for virtualization. The subsystem monitoring component 120 may iterate through registered subsystems asking each subsystem whether the subsystem is interested in handling the present application. The component 120 invokes one or more subsystems that indicate an interest in the application process so that the subsystems can monitor subsystem-specific configuration changes made by the application. The subsystem monitoring component 120 may inform the subsystem about the lifetime of the application so that individual subsystems can perform startup and shutdown tasks related to the subsystem. For example, some subsystems may monitor by taking a snapshot of configuration data before and after the application runs.

The package creation component 130 creates a package for storing configuration data related to the application being prepared for virtualization. The package may include various container file formats, which may include compression, authentication, encryption, or other processing, such as to make the package smaller or provide security or certainty of the author of a package. For example, the package can be a ZIP, CAB, or other archive file format suitable for storing many files and settings within a single file. The package creation component 130 creates the package when a new application is being prepared for virtualization and provides an API for subsystems to store subsystem-specific configuration information within the package. For example, the component 130 may pass a pointer to an interface for storing data when the extensible virtualization system invokes the subsystem.

The application package store 140 stores application packages between monitoring of the application being prepared for virtualization and deployment of the virtualized application to one or more client computer systems. The application package store 140 may include various storage media, such as a file system, network based storage, cloud-based storage service, database, and so forth.

The application deployment component 150 deploys an application package to a client computer system so that the client computer system can invoke the virtualized application. The component 150 may perform application-specific configuration on the client system, such as adding file type associations, adding a link to the application package, performing operating system service configuration, and adding web server configuration information. The application deployment component 150 may invoke a subsystem associated with the application package to perform subsystem-specific registration tasks to prepare the virtualized application to run on the client computer system.

The application execution environment 160 provides a level of indirection between the virtualized application and a host operating system of the client computer system. The wrapper may be very thin allowing the application to run nearly natively, such as when the application is designed to run on the host operating system. Alternatively or additionally, the wrapper may provide APIs and satisfy other constraints expected by applications designed for other operating systems or operating system versions. Thus, the application execution environment 160 provides a virtual application with the environment for which the application was designed using the available resources of the host operating system. The application execution environment 160 also invokes an appropriate subsystem (or subsystems) to provide subsystem-specific handling of the virtualized application during run time.

The computing device on which the extensible virtualization system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
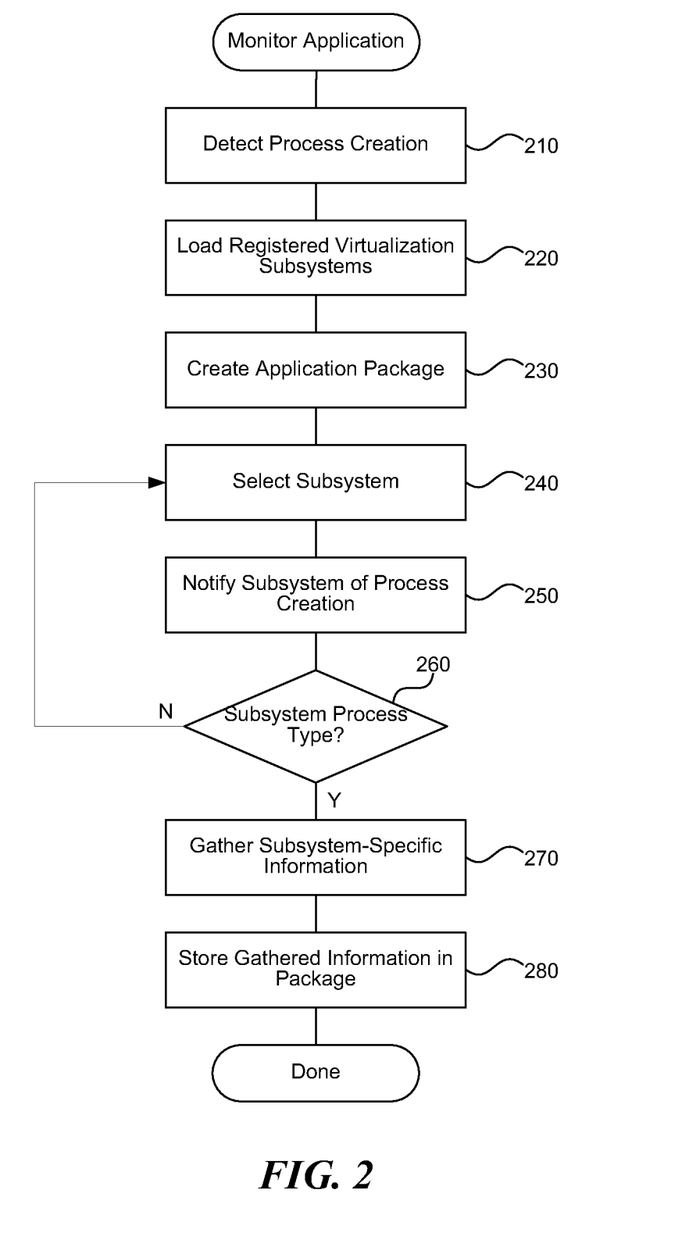
FIG. 2 is a flow diagram that illustrates processing of the extensible virtualization system to monitor an application, in one embodiment.

FIG. 2 is a flow diagram that illustrates processing of the extensible virtualization system to monitor an application, in one embodiment. Beginning in block 210, the system detects creation of a new process and injects a core virtualization system into the process. For example, if an administrator turns on monitoring and launches a desktop application, then the system detects the launch of the desktop application, starts the core virtualization engine, and injects the core virtualization system into the process so that, for example, the system can monitor API calls and other behavior of the process. Continuing in block 220, the system loads registered virtualization subsystems from a list of virtualization subsystems. For example, the system may store information about virtualization subsystems that register with the system in an operating system registry. In this way, the system can work with new systems simply by configuring the system and without modifying and rebuilding the system (e.g., without shipping a new core release each time a new subsystem is needed).

Continuing in block 230, the system creates an application package for storing configuration information for a virtualized application associated with the detected process. For example, the package may include an extensible markup language (XML) file or other container for configuration settings. Continuing in block 240, the system selects the first registered virtualization subsystem. On subsequent iterations, the system selects the next registered subsystem. Continuing in block 250, the system notifies the selected virtualization subsystem about the detected process creation and determines whether the virtualization subsystem wants to virtualize the process. For example, the system may call a creation function to load the virtualization subsystem and then pass the subsystem information about the process. The subsystem may provide a return value from the function that indicates whether the subsystem is interested in virtualizing the process. Different types of processes may be virtualized by different subsystems, and thus typically a single subsystem will indicate responsibility for the detected process.

Continuing in decision block 260, if the system determines that the selected subsystem can handle the detected process, then the system continues at block 270, else the system loops to block 240 to select the next virtualization subsystem. If no subsystem can handle the process (not shown), then the system completes and the process is run natively (i.e., not virtualized). Continuing in decision block 270, the virtualization subsystem collects subsystem-specific configuration information about the detected process as the process runs. For example, the subsystem may detect files and registry keys modified by the process, as well as other configuration changes, such as MICROSOFT ACTIVE DIRECTORY or IIS metabase changes. Continuing in block 280, the system stores collected configuration information in the created package. The system may supply an interface to subsystems so that a subsystem can serialize and deserialize subsystem-specific information to and from the created package. Thus, the package stores information common to the core virtualization system as well as subsystem-specific information in one place.

Figure 3:
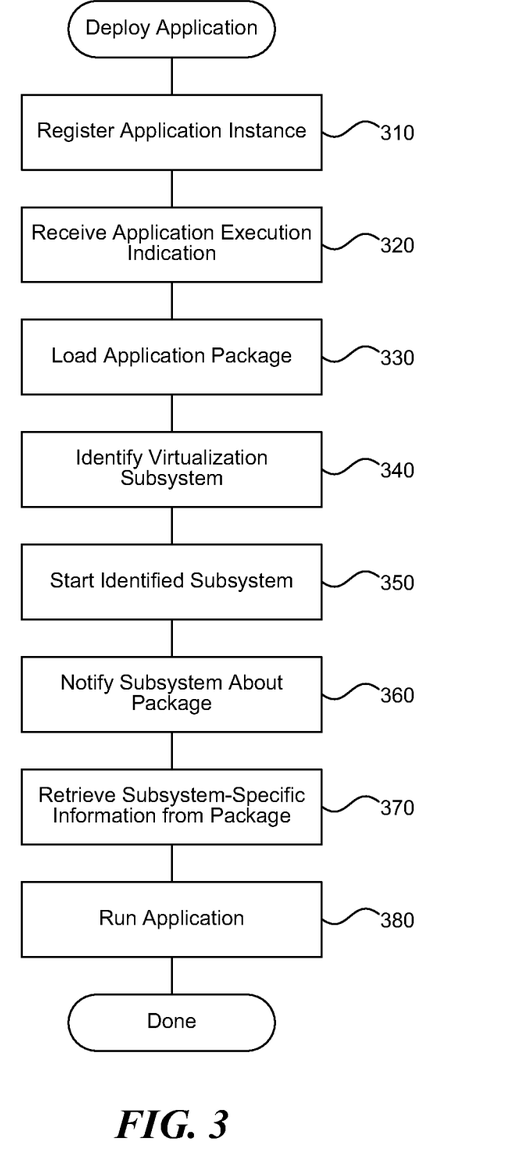
FIG. 3 is a flow diagram that illustrates processing of the extensible virtualization system to deploy a virtualized application, in one embodiment.

FIG. 3 is a flow diagram that illustrates processing of the extensible virtualization system to deploy a virtualized application, in one embodiment. Beginning in block 310, the system registers an instance of a virtualized application on a client computer system. For example, the extensible virtualization system may create links, file type associations, or other client entries that allow a user of the client to launch the virtualized application. Continuing in block 320, the system receives an application execution indication that indicates a request to launch the virtualized application. In the case of a desktop application, the indication may come from a user using the operating system shell. In the case of server applications, the indication may come from a request received over a network (e.g., to access a web page hosted by the server) or other source.

Continuing in block 330, the system loads an application package associated with the received application execution indication. For example, the indication may include a link invoked that specifies an application GUID or other identifier so that the system can find and launch the right virtualized application. The system may also retrieve core virtualization configuration settings from the loaded package. Continuing in block 340, the system identifies a virtualization subsystem associated with the application package. For example, the system may determine from the process command line whether or not the process should be virtualized by querying registered subsystems. The client may dynamically determine whether or not processes should be virtualized by their path within a package, by command line arguments specifically referring to the package name, or by querying each subsystem. If virtualized, all subsystems may be active within the virtual process. For example, the system may follow steps similar to steps 240 to 260 of FIG. 2 to iterate through registered subsystems and allow the subsystems to indicate a preference for virtualizing the process based on available information.

Continuing in block 350, the system starts the identified virtualization subsystem. For example, the system may locate a binary executable module associated with the subsystem, load the module, and execute an entry point function that causes the subsystem to start. Continuing in block 360, the system notifies the identified virtualization subsystem about the indication to execute the application package. For example, the system may pass a pointer to the package's data to the subsystem upon starting the subsystem. The subsystem may set up subsystem-specific hooks that allow the subsystem to handle execution of the virtualized application.

Continuing in block 370, the system retrieves subsystem-specific information from the application package upon request by the identified subsystem. The extensible virtualization system may provide a generic interface for serializing and deserializing information to and from the application package and subsystems may use the interface to retrieve settings stored by the subsystem in the package during the monitoring phase described herein. Continuing in block 380, the system runs the virtualized application using the identified subsystem and retrieved subsystem-specific information. For example, the system may allow the process, paused during a CreateProcess call so that the virtualization environment could load, to continue execution. As the application executes, any hooks or other indirection procedures put in place by the identified virtualization subsystem allow the subsystem to handle any application requests that require redirection or other handling to permit the isolation provided by virtualization. After block 380, these steps conclude.

Figure 4:
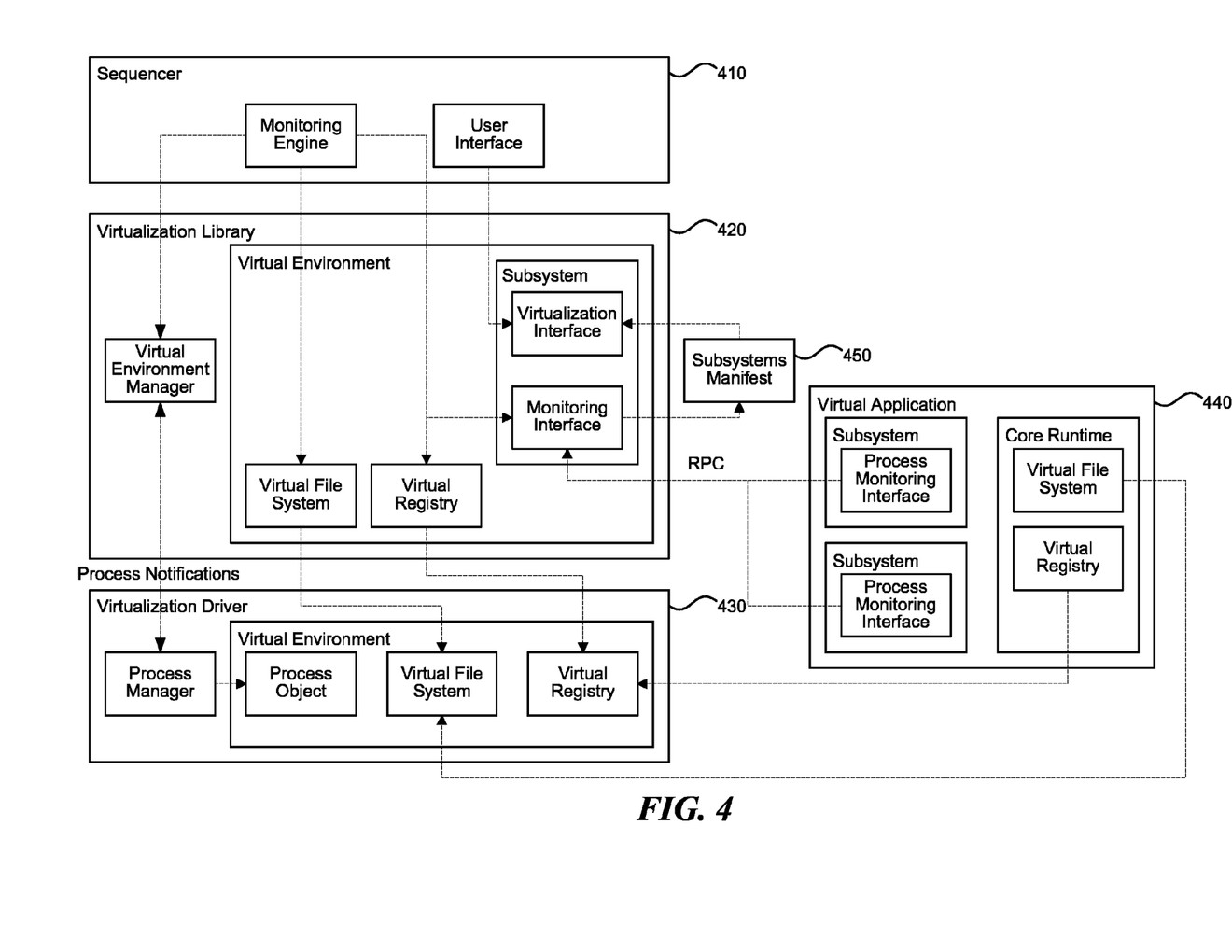
FIG. 4 is a block diagram that illustrates an operating environment and implementation components of the extensible virtualization system, in one embodiment.

FIG. 4 is a block diagram that illustrates an operating environment and implementation components of the extensible virtualization system, in one embodiment. In some embodiments, the extensible virtualization system uses an operating system driver 430 and several user mode components to virtualize applications. The virtualization driver 430 (e.g., sftplay.sys) manages virtual environments at a kernel level of the operating system. A process manager component of the driver maintains a process ID to virtual environment mapping. As processes are created, the process manager component automatically adds child processes to a parent process's virtual environment. The process manager component also notifies the user-mode virtualization library 420 about virtual process creation, termination, and when there are no processes left running within a virtual environment.

One role of the driver 430 is to perform registry and file system virtualization. Registry and file mapping information is uploaded to the driver 430 when a virtual environment is first created using the virtualization library 420. The driver 430 uses this information to alter the behavior of the registry and file system APIs so that to the virtual application 440 it appears as if the application is locally installed on a client computer system.

The user-mode virtualization library 420 (e.g., osguard.lib) contains APIs to manage virtual environments and processes and is the interface between user mode and the virtualization driver 430. The virtualization library 420 also has virtual subsystems built into it, including virtual file system and virtual registry, that are used across various extensible subsystems. The virtualization library 420 is used to package virtual applications as well as at run time. The sequencer 410 is an application used by administrators to package virtual applications by monitoring the install process, and the listener (not shown) is an operating system service that manages virtual applications at runtime.

A virtualization runtime module (e.g., sftldr.dll) is a library injected into each virtual process, either by the virtualization library 420 or by itself when creating child processes. A detours library is used to hook functions within the virtual application 440 process. Some calls are redirected to the virtualization driver 430 for registry and file system virtualization; the others make RPC calls into the virtualization library 420 to perform their respective subsystem virtualization.

During its initialization, the virtualization library 420 dynamically loads each subsystem module listed in the registry and stores pointers to their factory interfaces. When the sequencer 410 or listener uses the virtual environment manager to create a virtual environment, the factories are used to create an instance of each subsystem. The subsystem instances are stored within the virtual environment object and can be retrieved by the sequencer or the listener.

Many subsystems need access to the virtual file system and registry to perform their virtualization. For example, both virtual COM and virtual services subsystems need access to the virtual registry keys to create virtual COM objects and start virtual services respectively. Therefore, the virtual registry and file system subsystems are not generalized but rather are core components, in some embodiments. Subsystems can get access to these core subsystems through the virtual environment object passed to them through their monitoring and runtime interfaces.

The monitoring interface stores the subsystem changes it detected within a manifest 450 file. This manifest 450 is passed to other interfaces including the visualization interface, which displays and allows this information to be edited, and the registration interface, which uses the information to register components.

In some embodiments, the manifest stored by the extensible virtualization system is an XML file. XML files store information hierarchically in a declarative format, and allow various components and subsystems used for virtualization to separately store information needed by that subsystem. At runtime, each component or subsystem can easily locate and extract its own stored information from the XML file.

In some embodiments, the extensible virtualization system provides an object model for interacting with virtualization subsystems. The system provides interfaces for each subsystem responsibility, and an interface representing the subsystem wrap the other interfaces. Monitoring and runtime each use two interfaces, one used within the virtualized process which communicates with the one used by the virtualization library described herein. The resulting interface follows.

```
class subsystem
{
public:
    // Returns the subsystem name.
    virtual const std::wstring& name( ) const = 0;
    // Returns the subsystem's visualization interface.
    virtual subsystem_visualizer* visualizer( ) = 0;
    // Returns the subsystem's registration interface.
    virtual subsystem_registrator* registrator( ) = 0;
    // Returns the subsystem's monitoring interface.
    virtual subsystem_monitor* monitor( ) = 0;
    // Returns the subsystem's monitoring interface used within the
    // virtual process.
    virtual subsystem_process_monitor* process_monitor( ) = 0;
    // Returns the subsystem's runtime interface.
    virtual subsystem_runtime* runtime( ) = 0;
    // Returns the subsystem's runtime interface used within the
    // virtual process.
    virtual subsystem_process_runtime* process_runtime( ) = 0;
    // Returns the subsystem's VE wrapepr interface.
    virtual subsystem_ve_wrapper* ve_wrapper( ) = 0;
};
```

In some embodiments, the extensible virtualization system receives a factory interface from virtualization subsystems for working with the subsystems. Some subsystems need to store state shared by processes within the virtual environment, so an instance of a subsystem object is created for each virtual environment using the factory interface. Each subsystem module exports a function that returns a list of factory objects, one per subsystem implemented by the module. The virtualization library uses the factories to create instances of the subsystem each time a virtual environment is created. Configuration information (e.g., a registry key) controls which subsystem modules are loaded by the virtualization library. The factory interface definition follows.

```
class subsystem_factory
{
public:
    // Returns the name for the subsystem this factory will create.
    virtual const std::wstring& name( ) const = 0;
    // Creates an instance of a subsystem object.
    virtual shared_ptr<subsystem> create( ) const = 0;
};
```

In some embodiments, the extensible virtualization system invokes virtualization subsystems for testing. In addition to implementing virtual subsystems, these modules can be used for testing and debugging. One of the most difficult aspects of packaging virtual applications is diagnosing problems when the application does not run properly within a virtual environment. Since the subsystem modules are injected into the virtual processes, a module can monitor the virtual process by hooking APIs and looking for specific errors. Another use for these modules is functional testing of the virtualization library and sequencer. Modules can verify that the virtual registry and file system capture the correct information during monitoring by examining the raw data. They can also test the fault tolerance of the sequencer and listener by generating errors from their interfaces.

From the foregoing, it will be appreciated that specific embodiments of the extensible virtualization system have been described herein for purposes of illustration, but that various modifications may be made without deviating from the spirit and scope of the invention. Accordingly, the invention is not limited except as by the appended claims.

We claim:

1. A computer-implemented method for preparing an application for virtualization, comprising:
    detecting, by a computing device, an initiation of an installation of an application to be virtualized;
    in response to detection of the initiation of the installation of the application to be virtualized, identifying, by a core virtualization system executing on the computing device, a plurality of registered virtualization subsystems from a store of virtualization subsystems;
    based on the identification of the plurality of registered virtualization subsystems,
        programmatically determining, by the core virtualization system executing on the computing device, a virtualization subsystem to monitor the installation, including iteratively:
            selecting target virtualization subsystem from the plurality of registered virtualization subsystems;
            notifying the iteratively selected target virtualization subsystem of the initiation of the installation; and
            establishing whether the iteratively selected target virtualization subsystem is to monitor the installation;
    monitoring, by the determined virtualization subsystem, the installation, including:
        collecting configuration information associated with the application to be virtualized, the configuration information including at least some configuration information that is specific to the determined virtualization subsystem; and
    storing, by the computing device, the collected configuration information in an application package associated with the application to be virtualized.

2. The method of claim 1 wherein the method further comprises:

starting a core virtualization engine,
injecting the core virtualization system into the installation, and
monitoring application-programming interface (API) calls made by the installation.

3. The method of claim 1 wherein identifying the plurality of registered virtualization subsystems comprises loading stored information regarding virtualization subsystems that are registered in an operating system registry.

4. The method of claim 1 wherein the method enables the core virtualization system to be extended with new virtualization subsystems without modifying the core virtualization system.

5. The method of claim 1 wherein storing the collected configuration information comprises storing the collected confirmation information in an extensible markup language (XML) manifest.

6. The method of claim 1 wherein programmatically determining the virtualization subsystem comprises iterating through the registered virtualization subsystems until one of the registered virtualization subsystems indicates that it will monitor the installation.

7. The method of claim 1 wherein notifying the iteratively selected target virtualization subsystem comprises calling a function that loads the iteratively selected target virtualization subsystem and passing the iteratively selected target subsystem information regarding the installation.

8. The method of claim 1 wherein collecting configuration information comprises collecting, by a web server virtualization subsystem, web server configuration information.

9. The method of claim 1 wherein storing the collected configuration information comprises receiving a call to an object model interface from the iteratively determined virtualization subsystem.

10. The method of claim 1 further comprising storing a subsystem identifier in the application package that indicates the virtualization subsystem to be used for later execution of the virtualized application.

11. A computing device for application-level virtualization, the computing device comprising:
a memory and a processor that are respectively configured to store and execute instructions, including instructions that cause the computing device to:
detect, by the computing device, an initiation of an installation of an application to be virtualized;
in response to detection of the initiation of the installation of the application to be virtualized, identify, by a core virtualization system executing on the computing device, a plurality of registered virtualization subsystems from a store of virtualization subsystems;
based on the identification of the plurality of registered virtualization subsystems,
programmatically determine, by the core virtualization system executing on the computing device, a virtualization subsystem to monitor the installation, the programmatic determination including iterative:
selection of target virtualization subsystem from the plurality of registered virtualization subsystems;
notification of the iteratively selected target virtualization subsystem of the initiation of the installation; and
establishment of whether the iteratively selected target virtualization subsystem is to monitor the installation;
monitor, by the determined virtualization subsystem, the installation, the monitoring including:
collection of configuration information associated with the application to be virtualized, the configuration information including at least some configuration information that is specific to the determined virtualization subsystem; and
store, by the computing device, the collected configuration information in an application package associated with the application to be virtualized.

12. The computing device of claim 11, wherein the instructions also cause the computing device to:
start a core virtualization engine,
inject the core virtualization system into the installation, and
monitoring calls made by the installation.

13. The computing device of claim 11, wherein the instructions that cause the computing device to identify the plurality of registered virtualization subsystems also include instructions that cause the computing device to bad stored information regarding virtualization subsystems that are registered in an operating system configuration database.

14. The computing device of claim 11, wherein the instructions that cause the computing device to store the collected configuration information cause the collected confirmation information to be stored in an extensible markup language (XML) manifest.

15. The computing device of claim 11, wherein the instructions that cause the computing device to programmatically determine the virtualization subsystem cause the computing device to iterate through the registered virtualization subsystems until one of the registered virtualization subsystems indicates that it will monitor the installation.

16. The computing device of claim 11, wherein the instructions also cause the computing device to:
store a subsystem identifier in the application package that indicates the virtualization subsystem to be used for later execution of the virtualized application.

17. A computer-readable storage medium, not comprising a signal per se, having instructions stored thereon for controlling a computing device to perform actions to virtualize an application, wherein the actions comprise:
detecting, by the computing device, an initiation of an installation of an application to be virtualized;
in response to detection of the initiation of the installation of the application to be virtualized, identifying, by a core virtualization system executing on the computing device, a plurality of registered virtualization subsystems from a store of virtualization subsystems;
based on the identification of the plurality of registered virtualization subsystems,
programmatically determining, by the core virtualization system executing on the computing device, a virtualization subsystem to monitor the installation, including iteratively:
selecting target virtualization subsystem from the plurality of registered virtualization subsystems;
notifying the iteratively selected target virtualization subsystem of the initiation of the installation; and
establishing whether the iteratively selected target virtualization subsystem is to monitor the installation;
monitoring, by the determined virtualization subsystem, the installation, including:
collecting configuration information associated with the application to be virtualized, the configuration information including at least some configuration information that is specific to the determined virtualization subsystem; and storing, by the computing device, the collected configuration information in an application package associated with the application to be virtualized.

18. The computer-readable storage medium of claim 17, wherein the actions further comprises:
starting a core virtualization engine,
injecting the core virtualization system into the installation, and
monitoring calls made by the installation.

19. The computer-readable storage medium of claim 17, wherein programmatically determining the virtualization subsystem comprises iterating through the registered virtualization subsystems until one of the registered virtualization subsystems indicates that it will monitor the installation.

20. The computer-readable storage medium of claim 17, wherein notifying the iteratively selected target virtualization subsystem comprises:
calling a function that loads the iteratively selected target virtualization subsystem; and
passing information regarding the installation to the iteratively selected target subsystem.

21. The computer-readable storage medium of claim 17, wherein the actions further comprise:
storing a subsystem identifier in the application package that indicates the virtualization subsystem to be used for later execution of the virtualized application.

* * * * *